(12) United States Patent
Kahlon et al.

(10) Patent No.: US 8,539,450 B2
(45) Date of Patent: Sep. 17, 2013

(54) FAST AND ACCURATE DATA RACE DETECTION FOR CONCURRENT PROGRAMS WITH ASYNCHRONOUS CALLS

(75) Inventors: Vineet Kahlon, Princeton, NJ (US); Nishant Sinha, Plainsboro, NJ (US); Yun Zhang, Somerset, NJ (US); Eric J. Kruus, Hillsborough, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 282 days.

(21) Appl. No.: 12/702,023

(22) Filed: Feb. 8, 2010

(65) Prior Publication Data

US 2010/0235817 A1  Sep. 16, 2010

Related U.S. Application Data

(60) Provisional application No. 61/159,372, filed on Mar. 11, 2009.

(51) Int. Cl.
*G06F 9/44* (2006.01)
*G06F 9/45* (2006.01)

(52) U.S. Cl.
USPC ........... 717/126; 717/100; 717/110; 717/124; 717/141; 717/143

(58) Field of Classification Search
USPC .................. 717/126, 100, 110, 124, 141, 143
See application file for complete search history.

(56) References Cited

U.S. PATENT DOCUMENTS

| 5,896,537 | A  * | 4/1999 | Landi et al. | 717/132 |
| 7,089,537 | B2 * | 8/2006 | Das et al. | 717/132 |
| 7,487,502 | B2 * | 2/2009 | Wang et al. | 718/102 |
| 7,694,276 | B2 * | 4/2010 | Larus et al. | 717/116 |
| 2005/0235273 | A1 * | 10/2005 | Travison et al. | 717/136 |
| 2006/0112377 | A1 * | 5/2006 | Nacul et al. | 717/140 |
| 2008/0282221 | A1 * | 11/2008 | Kahlon et al. | 717/105 |
| 2009/0125887 | A1 * | 5/2009 | Kahlon et al. | 717/126 |
| 2009/0144707 | A1 * | 6/2009 | Goff et al. | 717/136 |
| 2009/0259972 | A1 * | 10/2009 | Kodosky et al. | 715/810 |
| 2009/0288025 | A1 * | 11/2009 | King et al. | 715/763 |

OTHER PUBLICATIONS

Sterling, N. "Warlock: A Static Data Race Analysis Tool" USENIX Winter Technical Conference, Jan. 1993. pp. 97-106.
Detlefs, D., et al. "Extended Static Checking" In TR SRC-159 Compaq SRC, Dec. 1998. (50 Pages).

(Continued)

*Primary Examiner* — Idriss N Alrobaye
*Assistant Examiner* — Getente A Yimer
(74) *Attorney, Agent, or Firm* — Joseph Kolodka

(57) ABSTRACT

A system and method for analyzing a concurrent program employ asynchronous function calls for communication and recursion. A control flow graph is constructed based on a context-sensitive pointer analysis, whereupon encountering a function pointer, a points-to set of the function pointer is computed in a context-sensitive fashion to determine a set of potential function calls. The context-sensitive pointer analysis is terminated when no new potential function calls are encountered and where the potential function calls may contribute new data races other than those that exist in the contexts traversed thus far. To decide this, a characterization of pointer aliasing based upon complete update sequences is employed. A set of contexts that may contribute to different data races are enumerated by tracking update sequences for function and lock pointers and pointers that are shared or point to shared memory locations. Data race detection is carried out on the control flow graph.

12 Claims, 4 Drawing Sheets

(56) References Cited

OTHER PUBLICATIONS

Dwyer, M., et al. "Tool-Supported Program Abstraction for Finite-State Verification" In Proceedings of the 23rd International Conference on Software Engineering (ICSE '01). IEEE Computer Society Press. May 2001. pp. 1-10.

Engler, D., et al. "RACERX: Effective, Static Detection of Race Conditions and Deadlocks" In SOSP '03, Oct. 2003. (16 Pages).

Kahlon, V. "Bootstrapping: A Technique for Scalable Flow and Context-Sensitive Pointer ALIA Analysis" In PLDI. Proceedings of the ACM SIGPLAN 2008 Conference on Programming Language Design and Implementation. Jun. 2008. (10 Pages).

Kahlon, V., et al. "Fast and Accurate Static Data-Race Detection for Concurrent Programs" In Computer Aided Verification (CAV). 19th International Conference. Jul. 2007. pp. 1-14.

Kahlon, V., et al. "Semantic Reduction of Thread Interleavings for Concurrent Programs" In Fifteenth International Conference on Tools and Algorithms for Construction and Analysis of Systems (TACAS), Mar. 2009. pp. 124-138.

Lee, C., et al. "Efficient and Precise Datarace Detection for Multithreaded Object-Oriented Programs" In PLDI '02. Jun. 2002. (12 Pages).

Li, P., et al. "Combining Events and Threads for Scalable Network Services Implementation and Evaluation of Monadic, Application-Level Concurrency Primitives" In PLDI '07: Proceedings of the 2007 ACM SIGPLAN conference on Programming language design and implementation, vol. 42, Issue 6. Jun. 2007. pp. 189-199.

Mellor-Crummey, J. "On-the-Fly Detection of Data Races for Programs With Nest Fork-Join Parallelism" In Proceedings of the 1991 Supercomputer Debugging Workshop. Nov. 1991. (12 Pages).

Naik, M., et al. "Conditional Must Not Aliasing for Static Race Detection". Proceedings of the 34th Annual ACM SIGPLAN-SIGACT Symposium on Principles of Programming Languages (POPL'07). Jan. 2007. (12 Pages).

Naik, M., et al. "Effective Static Race Detection for Java" In PLDI '06. Proceedings of the 2006 ACM SIGPLAN conference on Programming language design and implementation. Jun. 2006. (12 Pages).

Pratikakis, P., et al. "Locksmith: Context-Sensitive Correlation Analysis for Race Detection" In PLDI. Proceedings of the 2006 ACM SIGPLAN conference on Programming language design and implementation. Jun. 2006. pp. 1-57.

Savage, S., et al. "Eraser: A Dynamic Data Race Detector for Multithreaded Programming" In ACM Transaction on Computer Systems, vol. 15, No. 4. Nov. 1997. pp. 391-411.

Steensgaard, B. "Points-To Analysis in Almost Linear Time" In POPL. Proceedings of the 23rd ACM SIGPLAN-SIGACT symposium on Principles of programming languages. Jan. 1996. pp. 1-10.

\* cited by examiner

FAST AND ACCURATE DATA RACE DETECTION FOR CONCURRENT PROGRAMS WITH ASYNCHRONOUS CALLS

RELATED APPLICATION INFORMATION

This application claims priority to provisional application Ser. No. 61/159,372 filed on Mar. 11, 2009, incorporated herein by reference.

BACKGROUND

1. Technical Field

The present invention relates to computer program verification and more particularly to systems and methods for detecting data races in concurrent programs using asynchronous calls.

2. Description of the Related Art

Real-life concurrent programs often are based on an event-driven model where threads create tasks and dispatch these tasks to other threads, to be executed asynchronously. The tasks are queued on to a work queue of the other threads and are processed by the corresponding schedulers in an iterative fashion. This model combines the expressiveness of both thread and event-based models of computation, and has the advantage that the thread that creates the task may not wait for the task to finish.

Threads can delegate computationally intensive tasks to other threads while continuing with more immediate tasks. Several large industrial concurrent systems including Ajax-based scripts, routers, and web servers use this paradigm of concurrent computation.

Although providing much flexibility to a system designer and superior run-time performance, multi-threaded programs with asynchronous events are extremely hard to debug and verify. First, there is a loose correlation between the asynchronous call and the value returned making it difficult to track the flow of data across threads. More significantly, these calls are often made using function pointers, and arguments to these calls, in turn, contain function pointers to callback functions, which are executed, for example, upon completion of the call. Such indirect mechanisms for communication among threads make analysis of these programs extremely tricky. For example, the values of the function pointers passed into indirect calls depend on the particular calling context and therefore must be tracked context-sensitively.

SUMMARY

A system and method for analyzing a concurrent program stored in memory employs asynchronous function calls for communication. A control flow graph is constructed, using a processor, based on a context-sensitive pointer analysis, wherein upon encountering a function pointer, a points-to set of the function pointer is computed in a context-sensitive fashion to accurately determine a set of potential function calls. The context-sensitive pointer analysis is terminated when no new potential function calls are encountered such that no new potential function calls are determined using a characterization of pointer aliasing encountered based upon complete update sequences to decide whether new aliases are discoverable. Data races are detected in the concurrent program using the control flow graph which includes resolved context sensitive pointers.

A system and method for analyzing a concurrent program stored in memory and employing asynchronous function calls for communication is context-sensitive and works for programs with recursion. A control flow graph is constructed, using a processor, based on a context-sensitive pointer analysis, wherein upon encountering a function pointer, a points-to set of the function pointer is computed in a context-sensitive fashion to accurately determine a set of potential function calls. The context-sensitive pointer analysis is terminated when no new potential function calls are encountered and where the potential function calls may contribute new data races other than those that exist in the contexts traversed thus far. To decide this, a characterization of pointer aliasing based upon complete update sequences is employed. A small set of contexts that may contribute to different data races are enumerated in an efficient manner by tracking update sequences for function and lock pointers as well as pointers that are shared or point to shared memory location. Data race detection is then carried out on this finite context-sensitively computed control flow graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods perform static data race detection for concurrent programs which use asynchronous indirect function calls for communication and recursion. Given a multi-threaded program with asynchronous calls, the present method first builds a precise context-sensitive concurrent control flow graph (CCFG) based on a layered and context-sensitive pointer analysis. Using this CCFG, a staged data race detection is performed, that involves (i) identifying the shared variables and lock pointers, (ii) computing an initial database of race warnings, and (iii) pruning away the spurious warnings using a may-happen-in-parallel (MHP) analysis based on computing lock sets and performing program order analysis.

The present computation model comprises a thread pool, where each thread iteratively processes tasks from its work queue. To send a task request to another thread $t_2$, thread $t_1$ issues an asynchronous function call (fork) with the task (e.g., a function to be executed) as an argument. An asynchronous function call may or may not be followed by an asynchronous function return (join). Note that a fork join model for concurrent programs can be viewed as a particular case of the thread pool model (with unbounded number of threads, each having a zero-length queue), where fork corresponds to an asynchronous function call (AFC) to an unnamed thread while the join corresponds to the corresponding asynchronous return. When the thread pool is of finite size, each thread has a non-zero length queue to store multiple incoming job requests. Besides making asynchronous calls to other threads, each thread can also perform synchronous calls to function inside the same thread.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
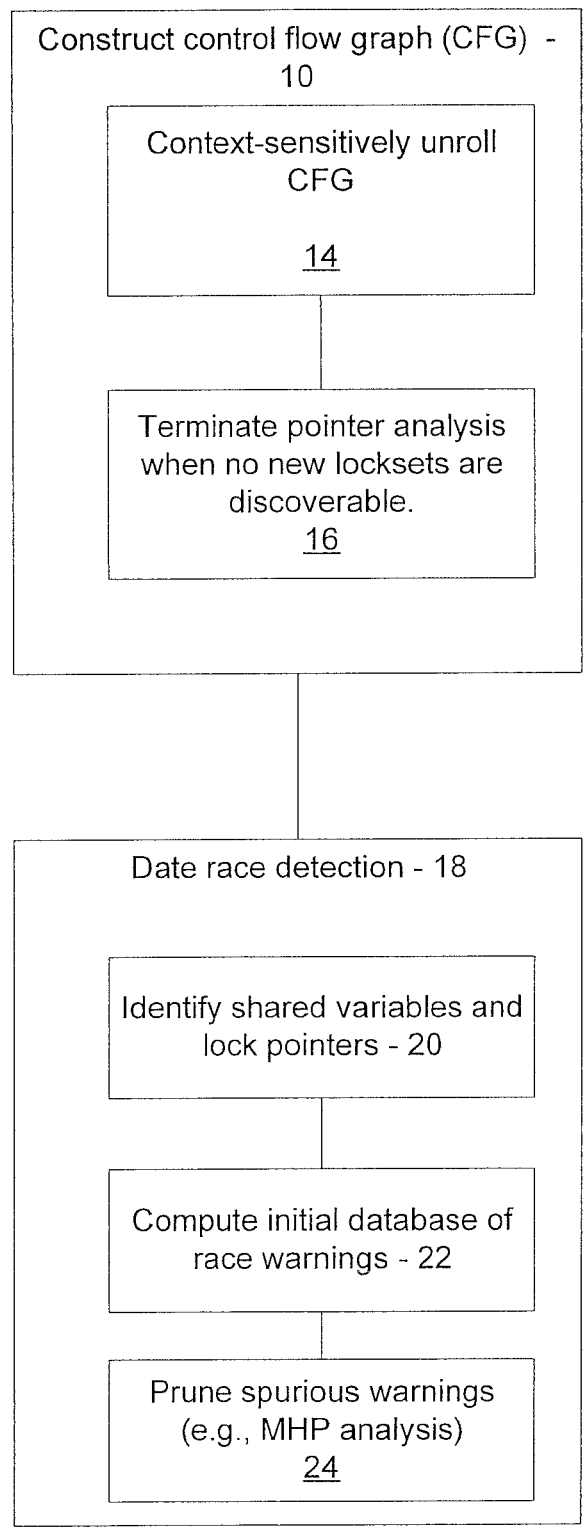
FIG. 1 is a block/flow diagram showing a system/method for constructing a control flow graph and performing a static data race detection analysis in accordance with the present principles.

Referring now in detail to the figures in which like numerals represent the same or similar elements and initially to FIG. 1, a system/method is illustratively described to perform static data race detection for concurrent programs which use asynchronous indirect function calls for communication. In block 10, given a multi-threaded program with asynchronous calls, the present method first builds a precise context-sensitive concurrent control flow graph (CCFG) based on a layered and context-sensitive pointer analysis. The control flow graph of the program is constructed for the purpose of static data race detection in the presence of asynchronous calls, function pointers, thread pointers and recursion.

For analyzing the concurrent program for static data race detection, a precise control flow graph (CFG) of the given program is built. The existing state-of-the-art builds a CFG of a given program with function pointers by carrying out a context-insensitive points-to analysis for the function pointers and incorporating a call to each function that belongs to the points-to set of a function pointer. This results in extraneous function calls in the CFG which do not correspond to any concrete execution of the given program thereby leading to false data race warnings. Moreover, existing techniques do not handle context sensitive data race detection in the presence of recursion.

In block 14, the control flow graph of the concurrent program is unrolled in a context sensitive fashion. This includes, upon encountering a function pointer, a points-to set of the function pointer is computed in a context-sensitive fashion to accurately determine the set of potential function calls.

Context sensitivity may include employing a computation model for constructing the control flow graph that employs a thread pool, where each thread iteratively processes tasks from its work queue. E.g., to send a task request to another thread $t_2$, thread $t_1$ issues an asynchronous function call (fork) with the task (e.g., a function to be executed) as an argument. An asynchronous function call may or may not be followed by an asynchronous function return (join). Note that a fork join model for concurrent programs can be viewed as a particular case of the thread pool model (with unbounded number of threads, each having a zero-length queue), where fork corresponds to an asynchronous function call (AFC) to an unnamed thread while the join corresponds to the corresponding asynchronous return. When the thread pool is of finite size, each thread has a non-zero length queue to store multiple incoming job requests. Besides making asynchronous calls to other threads, each thread can also perform synchronous calls to function inside the same thread.

In block 16, recursion is handled by terminating the exploration of the given program as soon as it is determined that no new locksets can be discovered at locations where shared variables are accessed due to which no new data race warning can be discovered via further exploration. A fixpoint computation is carried out via traversal of the control flow graph of the program by tracking aliases of lock pointers, aliases of shared variables and aliases of function pointers to decide whether new shared variable accesses with different locksets than those already encountered are discoverable.

The termination condition during the context-sensitive unrolling of the CFG determines whether any new race warning can be generated via further unrolling. This termination condition uses a characterization of pointer aliasing based on complete update sequences to decide whether new aliases can be discovered for lock pointers.

Using the CCFG, a staged data race detection is performed in block 18, that involves (i) identifying the shared variables and lock pointers in block 20, (ii) computing an initial database of race warnings in block 22, and (iii) pruning away the spurious warnings using a may-happen-in-parallel (MHP) analysis based on computing lock sets and performing program order analysis in block 24.

By employing the present principles context-sensitive data race detection is extended to programs with asynchronous calls, function pointers, thread pointers and recursion thereby increasing the precision of data race detection for such programs.

A more detailed explanation of the present principles will be described hereinafter using examples, exemplary pseudo-code and illustrative explanations.

Table 1 shows a slice of a concurrent C program which illustrates the complexity due to combining indirect function calls with thread creation in accordance with one illustrative embodiment. C-like syntax is employed together with a special thread construct to denote thread identifiers and named fork and join calls to denote thread creation and termination. More particularly, a call fork(t1, f, arg1, arg2, . . . ) denotes the creation of the thread with identifier t1 which executes the function f with the actual arguments arg 1, arg 2, etc. Similarly the call joint(t1) blocks the caller until the thread t1 finishes execution.

TABLE 1

Example Concurrent Program:

```
int h1 (int x) {
    return x * x;
}
int h2 (int y) {
    return y + y;
}
struct funcType {
    int (*func) (int);
}
void f (int x, funcType *g, int*z) {
12:    if (x>0) {*z=*(g→func)(x); }
13:    else { *z=*g→func)(-x); }
}
int main ( ) [
    struct funcType ft;
    int a, b, p1, p2, z;
    struct thread t1, t2;
```

TABLE 1-continued

Example Concurrent Program:

```
   ....
   if (p1) {
       ft.func = &h1;
10:    fork (t1, f, a, ft, &z);
       join (t1);
   }
   ...
   if (p2) {
       ft.func = &h2;
11.    fork (t2, f, b, ft, &z);
       join (t2);
   }
}
```

The example program in Table 1 starts from a main function, which creates thread t1 or t2 (lines 10, 11 respectively). Both the threads execute the function f; however, depending on the arguments passed to f, the callback function h1 or h2 is invoked. The function f obtains the return value from the callback function and then writes to a shared variable *z. Since the shared variable may be written in either thread t1 or t2, there is a potential race condition at the locations l2 and l3 in function f. However, as will be shown later, if we build the concurrent call graph in a context-sensitive manner and take into account the program order imposed by thread creation and join, we can prove the absence of the race condition. Also, note that since the functions h1 and h2 are called using function pointers, we may not be able to capture the asynchronous behavior of the program if a precise function pointer analysis is not available.

Real-life concurrent C programs are illustratively described in the examples, although the techniques can be extended to programs in other languages also. These programs include a main thread which forks one or more new threads and provides the new threads with a function pointer argument corresponding to the function that a new thread needs to execute. A join instruction is executed by the main thread to wait for the termination of the new thread. For this simple thread creation model, the thread creation overlaps with start of thread execution, in general. Large industrial applications go beyond the simple thread creation model by adopting a thread pool model, where a large number of threads are created at initialization and each thread is named, i.e., it has an unique identifier.

Since the threads exist already, a caller thread creates an execution job and then dispatches the job to a callee thread. A job may be viewed as a generalization of the thread arguments when creating a thread for the simple model. On dispatch, the job is enqueued to the work queue of the callee thread, to be executed at a later point. Note that the job creation or dispatch may not correspond to its immediate execution in the callee thread.

The different concurrency models are treated in a unified way. First, asynchronous and synchronous function calls are distinguished. In a case of a synchronous call, the caller thread must block computations until the call returns. In contrast, the caller thread is free to carry on computations after making an asynchronous call. All the calls in sequential programs are synchronous. In concurrent programs, thread creation calls in the simple model as well as dispatching jobs to other threads in the thread pool model correspond to an asynchronous function call (AFC).

We model both cases of an AFC by using a named fork construct: fork(thread id,J) which takes a thread identifier (number or a pointer variable) as the first parameter and dispatches the second parameter, job J to it. The job J contains both the pointer to the function f that must be executed by thread thread id as well as the arguments to f. Note again that the actual execution of J may not occur immediately after the dispatch step. For sake of convenience, we refer to asynchronous call edges as fork edges also.

Function pointers and Bindings: AFCs that execute on another thread are implemented using function pointers. A common mechanism is to use bound function objects, e.g., in the Boost library. The following example describes how a bound function object is created.

struct boundFunc*bf=bind (thread_t, &g, args); The bf object contains the thread pointer thread_t, the function pointer &g for a function g and the arguments args to g. On executing enqueue(bf) in the caller thread, the bf object is dispatched to the working queue of the thread thread_t, which is then executed in the first-in-first-out manner from the queue.

Concurrent Call Graphs. A call graph CG consists of nodes labeled by function names and has an edge from node f to g if f calls g. Multiple calls are recorded by labeling edges with the call location in f. A concurrent call graph consists of nodes labeled by a tuple $\langle tid, f \rangle$, where tid denotes the thread name in which function f will execute. In case of unnamed forks, we assign a new thread identifier to the created thread. A CCG has two kinds of directed edges: call and return, and each edge is labeled to be either synchronous or asynchronous. A thread fork(join) instruction gives rise to an asynchronous call/return edge.

CCFGs. A concurrent control flow graph (CCFG) is obtained from a concurrent call graph (CCG) by concertizing the function nodes by a function description, while maintaining the call and return edges.

Call context strings. A sequence of function calls is represented by a string including concatenation of individual function names. In case a function g is called multiple times from f, we use unique names which record the call locations of g in f. We also refer to a call string as a calling context. A call string of length two is referred to as local calling context. Otherwise, it is said to be a global calling context.

Summary maps. Given a function f and a location l inside the function, we define the summary map at location l over a data flow domain D to be the meet of the data flow facts computed along each of the paths starting from the initial basic block of f and terminating at l. We also refer to the summary map for/as the local summary map. A global summary for a call string can be obtained by composing the local summary maps for each constituent local call context. We are concerned with summary maps which track the values of function and thread pointer variables and shared variables: the summary map includes a mapping from the above pointer variables to the set of initial/global variables that the pointer variables may point-to. A method for computing local summary maps is described below.

Bootstrapping based Pointer Analysis: Steensgaard's Analysis. In Steensgaard's analysis, which is an analysis known in the art, aliasing information is maintained as a relation over abstract memory locations. Every location l is associated with a label or set of symbols $\phi$ and holds some content $\alpha$ which is an abstract pointer value. Points-to information between abstract pointers is stored as a points-to graph which is a directed graph whose nodes represent sets of objects and edges encode the points-to relation between them. An edge e: $v_1 \rightarrow v_2$ from nodes $v_1$ to $v_2$ represents the fact that a symbol in $v_1$ may point to some symbol in the set represented by $v_2$. y to x is to equate the contents of the location associated with y to x. This is carried out via unification of the locations pointed-to by y and x into one unique location and if necessary propagating the unification to their successors in the points-to graph. Assignments involving referencing or dereferencing of pointers are handled similarly. Since Steensgaard's analysis does not take the directionality of assignments into account, it is bidirectional. This makes it less precise but highly scalable. Table 2 shows the Steensgaard points-to graph for a small example.

TABLE 2

Steensgaard vs. Andersen Points-to Graphs

```
main( ){
    1a: p = &a;
    2a: q = &b;
    3a: r = &c;
    4a: q = p;
    5a: q = r;
}
```

Steensgaard Points-to Hierarchy. A key feature of Steensgaard's analysis that we are interested in is the well known fact that the points-to sets so generated are equivalence classes. Hence, these sets define a partitioning of the set of all pointers in the program into disjoint subsets that respect the aliasing relation, i.e., a pointer can only be aliased to pointers within its own partition. We shall henceforth refer to each equivalence class of pointers generated by Steensgaard's analysis as a Steensgaard Partition. For pointer p, let $n_p$ denote the node in the Steensgaard points-to graph representing the Steensgaard partition containing p. A Steensgaard points-to graph defines an ordering on the pointers in P which we refer to as the Steensgaard points-to hierarchy. For pointers p, q∈Q, we say that p is higher than q in the Steensgaard points-to hierarchy, denoted by p>q, or equivalently by q<p, if $n_p$ and $n_q$ are distinct nodes and there is a path from $n_p$ to $n_q$ in the Steensgaard points-to graph. Also, we write p~q to mean that p and q both belong to the same Steensgaard partition. The points-to sets generated by Steensgaard's Analysis are equivalence classes.

Divide and Conquer via Bootstrapping. Whole program flow sensitive and context sensitive (FSCS) alias analysis is expensive. However, for many applications we provide FSCS aliases of only a small set of pointers of interest. For example, for static data race detection, we need to compute FSCS aliases for only the lock pointers. Thus, if we are interested in computing the aliases of pointers in a given set S, we want to leverage divide and conquer by restricting our analysis only to those statements of the given program that may affect aliases of pointers in S. Towards that end, we leverage bootstrapping which exploits the fact that while, in general, aliasing is not an equivalence relation, many widely used pointer analyses like Steensgaard's generate equivalence relations that are overapproximations of aliasing. Indeed, if we define two pointers as aliasing each other if they occur in the same Steensgaard computed points-to set (the same node in the Steensgaard points-to graph) then the resulting relation is in fact an equivalence relation.

The equivalence classes generated by this relation are referred to as Steensgaard Partitions. These partitions have the property that they respect aliasing, i.e., each pointer can only be aliased to a pointer in its partition. A standard, but important, observation is that aliases of a pointer in partition P can be affected only by assignments to either a pointer in P or a pointer q higher in the Steensgaard points-to hierarchy than some pointer in P. Assume now that our goal is to compute Andersen aliases of a pointer p∈P. Then, it suffices to restrict our analysis only to statements that directly modify values of pointers in the set $P_≧$ comprised of all pointers q such that either q>p or q~p.

More generally, it follows from the above observation that if we are interested in the FSCS aliases of pointers in a set S, then it suffices to restrict the analysis to pointers in Steensgaard-closure of S defined as follows: Definition (Steensgaard Closure). The Steensgaard closure of a set S of pointers, denoted by Cl(S), in the minimal set with the property that S ⊂ Cl(S) and for each p∈Cl(S) if either q~p or q>p then q∈Cl(S).

Coming back to the application at hand, suppose that S is the set of lock pointers. It is usually the case that lock pointers only alias other lock pointers. Thus, if a Steensgaard partition P has at least one lock pointer then, in fact, all pointers in P are likely to be lock pointers. In that case, Cl(S) would simply be the set of lock pointers, pointers to lock pointers, pointers to pointers to lock pointers, etc. Thus, when computing FSCS aliases of the set S of lock pointers, we can slice away all statements of the given program that do not affect the aliases of lock pointers, i.e., those that are not assignments to any pointer in Cl(S). Since the number of statements affecting lock pointers is typically small bootstrapping results in a highly precise as well as scalable FSCS analysis for lock pointers. Similarly, if one is interested in the FSCS summaries of only function pointers, then bootstrapping enables us to restrict the analysis to those statements that can affect function pointer aliases which are extremely few in number.

Complete Update Sequences. In resolving points-to sets of function pointers during construction of a control flow graph (CFG), a notion of complete update sequences plays a role. We start with some definitions. A pointer p is said to be semantically equivalent to q at location l if p and q have the same value at l (even if they are syntactically different).

Definition (Complete Update Sequence). Let $\lambda:l_0, \ldots, l_m$ be a sequence of successive program locations and let $\pi$ be the sequence $l_{i_1}: p_1=a_0, l_{i_2}: p_2=a_1, \ldots, l_{i_k}: p_k=a_{k-1}$ of pointer assignments occurring along $\lambda$. Then, $\pi$ is called a complete update sequence from p to q leading from locations $l_0$ to $l_m$ iff
    $a_0$ and $p_k$ are semantically equivalent to p and q at locations $l_0$ and $l_m$ respectively.
    for each j, $a_j$ is semantically equivalent to $p_j$ at $l_{i_j}$
    for each j, there does not exist any (semantic) assignment to pointer $a_j$ between locations $l_{i_j}$ and $l_{i_{j+1}}$ to $a_0$ between $l_0$ and $l_{i_1}$ and to $p_k$ between $l_{i_k}$ and $l_m$ along $\lambda$.

A related concept is that of maximally complete update sequences.

Definition (Maximally Complete Update Sequence). Given a sequence $\lambda:l_0, \ldots, l_m$ of successive control locations starting at the entry control location $l_0$ of the given program, the maximally complete update sequence for pointer q leading from locations $l_0$ to $l_m$ along $\lambda$ is the complete update sequence $\pi$ of maximum length, over all pointers p, from p to q (leading from locations $l_0$ to $l_m$) occurring along $\lambda$. If $\pi$ is an update sequence from p to q leading from locations $l_0$ to $l_m$, we also call it a maximally complete update sequence from p to q leading from locations $l_0$ to $l_m$. Maximally complete update sequences can be used to characterize aliasing.

Theorem. Pointers p and q are aliased at control location 1, there exists a sequence $\lambda$ of successive control locations starting at the entry location $l_0$ of the given program and ending at 1 such that there exists a pointer a with the property that there exist maximally complete update sequences from a to both p and q (leading from $l_0$ to 1) along $\lambda$.

Advantages of using Update Sequences. A key advantage of using update sequences to characterize aliasing is that update sequences can be summarized in a compact manner.

Additionally, bootstrapping allows us to exploit locality of reference. Indeed, since Steensgaard partitions are typically small, by restricting summary computation to each individual partition ensures that the resulting summaries will also be small. Secondly, the number of statements modifying values of pointers in a given partition also tend to be few and highly localized to a few functions. This in turn, obviates the need for computing summaries for functions that do not modify any pointers in the given partition which accounts for a majority of the functions.

Note that without partitioning it would be difficult to ensure viability of the summarization approach. Thus, the synergy between divide and conquer and summarization that assists in providing the scalability of the FSCS alias analysis.

Concurrent Control Flow Graph Computation. Once a concurrent call graph (CCG) is obtained, the concurrent control flow graph (CCFG) can be obtained directly by refinement. As a result, it is not possible to compute the call graph from the syntactic program description. To resolve these function pointers one needs to carry out a function pointer alias analysis for which, we need to compute the control flow graph. This creates a cyclic dependency wherein to compute the CFG we need to first resolve points-to sets of function pointers for which we need to already have computed the CFG.

Function Pointers. Realistic programs often make use of indirect function calls via function pointers. As a result, it is not possible to compute the call graph from the syntactic program description. To resolve these function pointers, one needs to carry out a function pointer alias analysis for which, we in turn, need to compute the control flow graph. This creates a cyclic dependency wherein to compute the CFG we need to first resolve points-to sets of function pointers for which we need to already have computed the CFG.

Callback Functions. Callback functions are often passed as arguments to function calls for exception handling. These callback functions, which are usually passed via function pointers, may be initialized before the function call to which these pointers are passed as parameters. Therefore, the values of function pointer arguments are tracked for each function call to build the control flow graph (CFG). An additional challenge exists in that the values of function pointers, in many cases, depend on the actual calling context of the called function. For example, suppose a function f calls other functions using indirect function calls. Depending on the particular call context of f (and the corresponding call arguments), f may call different functions for each context.

Recursion. To resolve function pointers, a context-sensitive alias analysis is carried out for the function pointers. Because of the cyclic dependency between CFG construction and resolution of points-to sets, we need to construct the CFG context-sensitively. Towards that end, we start from the entry function and start enumerating the contexts of the given program. As soon as a function pointer is encountered in given context, its points-to set is computed which allows us to continue constructing the call graph. Note that since we resolve the points-to set of the given program in a given context, we can usually resolve the function being called in a unique. If we had merely computed context-insensitive points-to sets of function pointers, then the resulting CFG could have redundant function calls thereby making our analysis less accurate. A direct consequence of this inaccuracy would be an increase in the number of bogus data race warnings. A context-sensitive CFG construction presents no problems in the absence of recursion. In the presence of recursion, however, the number of calling contexts for f can in principle be infinite. This may result in the size of the context sensitive CFG being infinite.

Resolving Points-to Sets of Lock Painters. To keep the number of bogus warnings low, resolving the points-to sets of lock pointers for lockset computation has to be carried out in a context-sensitive fashion. This is because lock pointers point to different lock pointers in different contexts. Thus, if the lock sets are not computed context-sensitively, we may end up with empty must-lock sets thereby increasing the bogus warnings rate. In the presence of recursion, however, the number of contexts could potentially be infinite.

CCFG Construction. We start by presenting a method set forth in Table 3 for constructing the concurrent control flow graph (CCFG) that handles the issues discussed above while ensuring both scalability as well as accuracy of the overall static data race detection framework. For ease of exposition, we show how to address the above challenges is a step-wise manner. We start with CCFG construction in the presence of function pointers.

TABLE 3

Method 1

1: Initialize Processed to the empty set and worklist W to $\{(\epsilon,\text{start},\text{entry}_{start})\}$, where $\text{entry}_{start}$ is the entry location of the entry function start of the given concurrent program and $\epsilon$ denotes the empty-call string.
2: while W is not empty do
3:    Delete tuple tup = (con,func,loc) from W and add it to Processed
4:    if loc is the site of a function call fcall to function g, say, then
5:       the set of successors Succ of tup is
      Succ = $\{(\text{con.fcall},g,\text{entry}_g)|\text{entry}_g$ is the entry location of g$\}$
6:    else
7:       Succ = $\{(\text{con},\text{func},\text{loc}')|\text{loc}'$ is the successor location of loc in func$\}$
8:    end if
9:    for each tup' in Succ do
10:       Add tup' as a successor of tup
11:       if tup' $\notin$ Processed $\cup$ W then add tup' to W
12:    end for
13: end while Function Pointer Resolution. As noted, the presence of function pointers creates a cyclic dependency with respect to CCFG construction. To construct the CCFG, we need to resolve the points-to sets of the function pointers. However computation Method 1 Context-Sensitive Call Graph Construction of the (flow and context-sensitive) points-to sets of the function pointers in turn needs to first compute the CCFG. To resolve this cyclic dependency, we carry out a context-sensitive construction of the CCFG. The procedure is a worklist-based method shown as Method 2 in Table 4.

TABLE 4

Method 2

1: Input: A Steensgaard closed set P
2: Initialize Processed to the empty set and worklist W to $\{(\epsilon,\text{start},\text{entry}_{start},A_0)\}$, where $\text{entry}_{start}$ is the entry location of the entry function start of the given concurrent program and $\epsilon$ denotes the empty-call string; and $A_0$ is the initial aliasing relating that assigns to each pointer p $\in$ P the set $\{p\}$.

TABLE 4-continued

Method 2

```
3:   while W is not empty do
4:       Delete tuple tup = (con,func,loc) from W and add it to Processed
5:       Succ ≠ φ
6:       if loc is the site of a function call fcall to function g, say, then
7:           if for some con' a tuple of the form (con'.fcall,g,entry_g,A) does not
             belong to Processed then
8:               Succ = {(con.fcall,g,entry_g,A)|entry_g is the entry location of g}
9:           end if
10:      else
11:          if the program statement at loc modifies a pointer in P then
12:              compute a new aliasing relation A' by composing summaries for
                 complete update sequences as formulated in [9]
13:          else
14:              A' = A
15:          end if
16:          Succ = {(con,func,loc',A')|loc' is the successor location of loc in func}
17:      end if
18:      for each tup' in Succ do
19:          Add tup' as a successor of tup
20:          if tup' ∉ Processed ∪ W then add tup' to W
21:      end for
22:  end while
```

Starting with the entry location of the given concurrent program, we build a (potentially infinite) graph over tuples of the form (con,func,loc), where loc is the current program location of function func in context con. Here, con is defined by means of a call string, i.e., a sequence of function calls leading to func.

To start with, the worklist W is initialized to $\{(\epsilon, \text{start}, \text{entry}_{start})\}$, where $\epsilon$ denotes the empty call string, start the entry function of the given program and $\text{entry}_{start}$ the entry location of start. In each iteration, we remove a tuple tup= (con,func,loc) from W. Each successor of tup is of the form (con',func',loc'), where (i) if loc is not a function call site then con'=con, func'=func and location' is a successor location of loc in func, and (ii) if location is the site of a function call fcall to function g then con'=con.fcall, func'=g and loc'=entry$_g$, where g is the entry location of g.

In the second case, if the function call is via a function pointer func$_{ptr}$, then to resolve the (potential) function calls at loc, we compute the flow and context-sensitive points-to set of func$_{ptr}$ at locution loc in context con.

Two points are worth noting:

1. Breaking the Cyclic Dependency: Note that in the case where the function call at loc is via the function pointer func$_{ptr}$, all function pointers in con have already been resolved in the construction of the CCFG. This breaks the cyclic dependency discussed above so that the flow and context-sensitive points-to set of func$_{ptr}$ can now be computed and the construction of the CCFG carried forth.

2. Leveraging Bootstrapping for FSCS analysis of function pointers: The second point is that if we carried out a whole program flow and context sensitive alias analysis to determine the points-to set of func$_{ptr}$, the resulting CCFG construction would be prohibitively expensive. Thus, to ensure scalability we leverage bootstrapping, which permits restriction of the analysis only to function pointers and those higher in the points-to hierarchy than function pointers. This effectively permits slicing all statements in the given program except those that could affect points-to set of function pointers which are extremely few in number. This ensures scalability of the FSCS function pointer analysis.

Finitization of the CCFG. In the presence of recursion, the above (pseudo-method 1) will not terminate and will generate an infinite CCFG. This is because, in this case, the number of contexts is infinite. Indeed, if we consider even the simple case of a self recursive entry function f, we can generate the infinitely many contexts call$^i_f$, where call$_f$ is a call to f in f. For some applications, like model checking, which involve exhaustive state space searches of the program at hand, we have to consider all possible contexts. However for many static analyses, we can restrict the set of contexts that need to be considered without losing precision of the analysis at hand. Specifically, for the present application, e.g., lockset-based static data race detection, by exploiting the fact that not all these contexts may generate different data race warnings, we show that it suffices to explore only a finite number of contexts. Broadly speaking, the strategy is to consider only those contexts that may generate different locksets at locations where shared variables are accessed. This, in turn, boils down to considering only those contexts which may generate different points-to sets for lock pointers at these locations.

Finitization via Lock Alias Preservation: One strategy for finitizing the CCFG is to explore only those contexts in which the points-to sets of lock pointers are different. In general, tracking points-to sets of all pointers in the given program in different contexts would be intractable. For the present application, however, we need to track points-to sets of only lock pointers. Towards that end, we leverage bootstrapping. For the present application, we are interested only in the FSCS aliases of the set S of lock pointers of the given program. In this case, the Steensgaard closure Cl(S) of S would simply be the set of lock pointers, pointers to lock pointers, pointers to pointers to lock pointers, etc. Thus, when computing FSCS aliases of the set S of lock pointers, we can slice away all statements of the given program that do not affect the aliases of lock pointers, i.e., those that are not assignments to any pointer in Cl(S). Since the number of statements affecting lock pointers is usually small bootstrapping results in a highly precise as well as scalable FSCS analysis for lock pointers. This not only ensures scalability of the overall analysis but helps keep the size of CCFG small.

In computing the CCFG in a context sensitive fashion, if we encounter a function call again in a given context, we need to decide whether to continue exploring it or not. Let con=con$_1$.fcall$_1$.con$_2$.fcall$_2$ be a context, i.e., a sequence of function calls, such that fcall$_1$, and fcall$_2$ are instances of the same function call. If in constructing the CCFG, we have already explored the context $con'=con_1.fcall_1.con_2$ and encounter the function call $fcall_2$, then our criterion for continuing to explore $fcall_2$ is whether doing so could lead to the discovery of new aliases for lock pointers at locations where shared variables are accessed. To that end, we show that if in the two contexts con' and $con_i$ the aliases of all pointers in Cl(LP), the Steensgaard closure of LP, are the same then exploring $fcall_2$ further cannot lead to the discovery of new locksets at locations where shared variable are accessed. This follows as a corollary of the following result.

Theorem (Small Model). Let S be a set of pointers and let $Con_1=con_1.fc_1$ and $Con_2=con_2.fc_2$ be contexts such that $fc_1$ and $fc_2$ are instances of the same function call fc to function g. Suppose that for each $p \in Cl(S)$, the aliases of p are the same at any location of g in $Con_1$ and $Con_2$. Then, for any sequence seq of function calls leading to function h, if $Con'_1 = Con_1.seq$ and $Con'_2 = Con_2.seq$ are valid contexts then the aliases of each pointer in Cl(S) are the same at each location of it in $Con'_1$ and $Con'_2$.

Let P be a Steensgaard closed set. The above result implies that if during the construction of the CCFG, a function call fcall is encountered again in a context con, then it suffices to explore fcall only if the set of aliases for some pointer $p \in P$ is different from each instance of fcall occurring along con. To track alias sets, we augment the tuples of Method 2 with the aliasing relation $A \subseteq P \times 2^P$ that assigns to each pointer $p \in P$ its set of aliases. Thus, each tuple is now of the form (loc,func,con,A), where A(p) is the set of aliases of p at location loc of function func in context con. To start, the alias set for each pointer p is set to {p}.

In each iteration, we delete a tuple (loc,func,con,A) from worklist W. If loc is the site of a function call fcall to function p then in order to decide whether to explore fcall in context con, we check whether loc has been visited with the aliasing relation A, i.e., whether there exists con' such that the tuple (loc,func,con',A) has already been encountered. If that is the case, then from the theorem, we see that exploring fcall in con will not head to the exploration of new aliases. Next, we consider the case when loc is not a function call site. In that case, if the statement at loc modifies a pointer in P, the aliasing relation needs to be updated. Based on the context-sensitive concurrent call graph, we can directly obtain a concurrent control flow graph (CCFG) by instantiating the function body corresponding to each call graph node.

Figure 2:
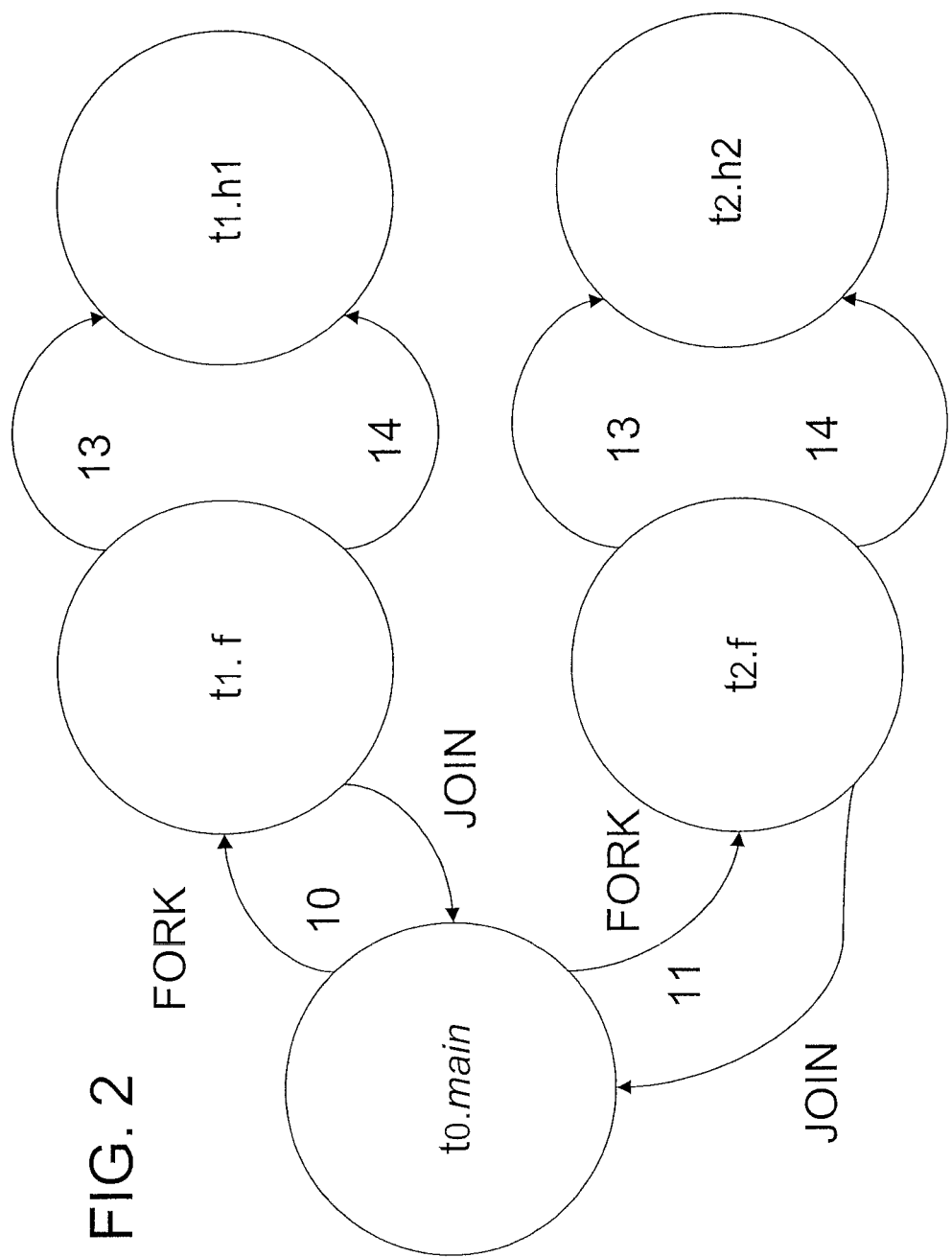
FIG. 2 is an illustrative control flow graph for an illustrative concurrent program of Table 1.

Example. The concurrent call graph for the example program in Table 1 is shown in FIG. 2. With reference to FIG. 2, each node in labeled by both a thread identifier (t) and function name (e.g., main, f, h, etc.). Multiple calls to other functions from a single function are labeled by the corresponding calling locations (e.g., 10, 13, etc.), which correspond to the line number in Table 1, to distinguish the contexts. The "fork" and "join" edges are also explicitly marked.

Data race analysis. A data race is possible for a shared variable being accessed by two threads concurrently, if one of the accesses is a write. To detect possible data races, we first detect all the shared variables, and then check if kinds of concurrent access are possible for any of the shared variables. Program synchronization constructs, e.g., locks, may disallow a concurrent access of a shared variable. Similarly, the order of instructions in the concurrent control flow graph (CCFG) as well as the order of asynchronous function calls (AFCs) may prevent two accesses from happening together. In this illustrative description, we present a general May-Happen-in-Parallel (MHP) Method 3 for computing which concurrent accesses can happen in the presence of lock synchronization and program order constraints.

TABLE 5

Method 3: Program order analysis

MHPlocs : = { }
for all Fork-join call pair fj = $(l_{fk}, l_{jn})$ in CCFG do
   $Loc_{parent} := \{l || l_{fk} \to l \wedge l \to l_{jn}\}$
   $Loc_{child} := \{l || child.start \to_{fj} l \wedge l \to_{fj} child.end\}$
   MHPlocs := MHPlocs $\cup$ $(Loc_{parent} \times Loc_{child})$
end for
Remove all locations in MHPlocs that correspond to the same thread Large concurrent C programs have shared variables mostly accessed via pointers. Similarly, lock variables (e.g., those accessed via spinlock) are also pointers. To detect MHP information precisely, we need to compute both shared variables and lock access variables in a precise context-sensitive manner. We first discuss detection of shared and lock variables in a concurrent CFG.

Shared Variable Detection. The set of shared variables consists of all variables that are either global variables of threads or their aliases. Note that local pointer variables may also alias global variables and result in a data race violation. However, if we label all local pointer aliases as shared access, we will end up with a large number of spurious warnings. Therefore, we are only interested in the set of alias variables that used to actually update the values of global variables. Using the CCFG computed above, we use a data flow analysis on pointer variables to compute the set of shared variables. The analysis essentially propagates assignments in complete update sequences from variables p to q (where p is global). If the sequence is followed a modification of some scalar variable via q, then q is marked as shared. Data flow analyses are known in the art.

Initial Data-race warnings. After we have computed the set of shared variables, we can compute a conservative estimate of the data races by considering all syntactic accesses of the shared variables in the program CCFG of which at least one access is a write to the shared variable. For industrial sized programs, this conservative estimate leads to thousands of warnings, many of which are spurious. A staged MHP analysis may be employed, which prunes away the spurious warnings by first taking into account acquire patterns of locks and then using program order constraints imposed by fork and join instructions in the CCFG. We first initialize a warning database consisting of a conservative estimate of all possible pairs of locations that may access some shared variable and then perform MHP analysis to prune off redundant warnings from the database.

MHP analysis. Lockset analysis: Two accesses to shared variables in different threads may not happen simultaneously if they require each thread to hold a common lock. To detect such exclusive shared variable accesses, we compute a conservative estimate of the set of locks that need to be acquired (locksets) at each shared variable access. Different call contexts can also lead to different sets of locks being acquired at a particular shared variable access location. The locksets are computed in a context-sensitive fashion. Since, the CCFG construction itself was done in a context-sensitive manner, the lock-set computation can be combined with it. Therefore, at the end of CCFG computation, we obtain the context-sensitive locksets at each shared variable access location. We can then check if a given pair of shared accesses always has a common lock in the corresponding locksets for all possible contexts. In that case, the pair of locations is removed from the warning database.

Program order analysis: The order of program statements in the CCFG prohibits some concurrent accesses. For example, consider a system of two threads: $t_0$ and $t_1$, where $t_0$ creates $t_1$ and later waits for $t_1$ to join. An access to a shared variable x in thread $t_1$ cannot happen concurrently with an access to x in $t_0$ if the access in $t_0$ follows the join instruction corresponding to $t_1$. The program order analysis is designed to reveal the hidden sequential behavior (of above form) in a program that arises due to the thread creation model and the sequence of program statements.

Fork-join model. We first note that the thread creation model based on fork and join events has the following characteristics: 1. All the statements in the parent thread between fork and join point may happen in parallel with all statements in the child thread (and threads created by the child thread); and 2. No other statements can happen in parallel. The program order analysis exploits the above characteristics of fork join model to compute a more precise MHP set.

Threadpool model. In the threadpool model, function tasks are dispatched for execution to previously created threads by asynchronous function calls. These calls correspond to a fork instruction, implicitly. However, these instructions do not have a corresponding join instruction. To conservatively estimate the effect of these calls, a matching join instruction is introduced at the last location of the parent thread, i.e., the thread that issues the asynchronous function call. This allows any instruction of the parent thread to happen in parallel with the locations in the function executed on another thread.

Given a thread t, let children(t) denote the set of threads created by t. For each thread t, we denote the first and last program locations in t by t.start and t.end respectively. In general, t.start and t.end are not unique since multiple fork calls can be dispatched to the same thread in the threadpool model. However, given a fork call instruction to thread t, t.start and t.end are uniquely defined. Also, let $\rightarrow_{fj}$ and $\rightarrow$ denote the program transition relation in CCFG with and without the fork and join edges, respectively.

Method 3 shows the details of the analysis. $Loc_{parent}$ consists of all the locations in the parent thread that are forward reachable from the fork call and backward reachable from the join instruction without following any fork or join edges. The set $Loc_{child}$ consists of all the locations in the child thread as well as threads created by child threads recursively. The analysis produces the set of MHPlocs of the set of location pairs that may happen in parallel.

Based on the program order analysis, we can now prune the warning database by removing any warning location pairs that do not occur in the MHPlocs set. We can further optimize the computation of MHPlocs by only keeping locations that perform shared variable accesses.

Example. Recall the example program in Table 1. As mentioned, the program has two potential data race conditions in the function f on the shared variable pointed to by the argument z. More precisely, the races involve location pairs (t1.f .l1.t2.f .l2) and (t1.f .l3.t2.f .l3) since function f is executed by both threads t1 and t2. However, if we perform program order analysis on the context-sensitive CCFG obtained from the program, we find that the above location pairs are not in the set MHPlocs, since the thread t2 can only execute after the thread t1 finishes executing.

Data race detection being a problem of fundamental interest has been the subject of extensive research. Many techniques have been leveraged in order to attack the problem including dynamic run-time detection, static analysis and model checking. In this disclosure, we have presented methods to perform static data race detection for concurrent programs that use asynchronous indirect function calls for communication. A new technique for context-sensitive CFG construction is provided that guarantees termination even in the presence of recursion and without losing precision of the analysis at hand. This enables us to build a framework for fast and accurate data race detection that can handle concurrent programs with complex programming constructs thereby making such an analysis practical for a larger class of realistic programs.

Figure 3:
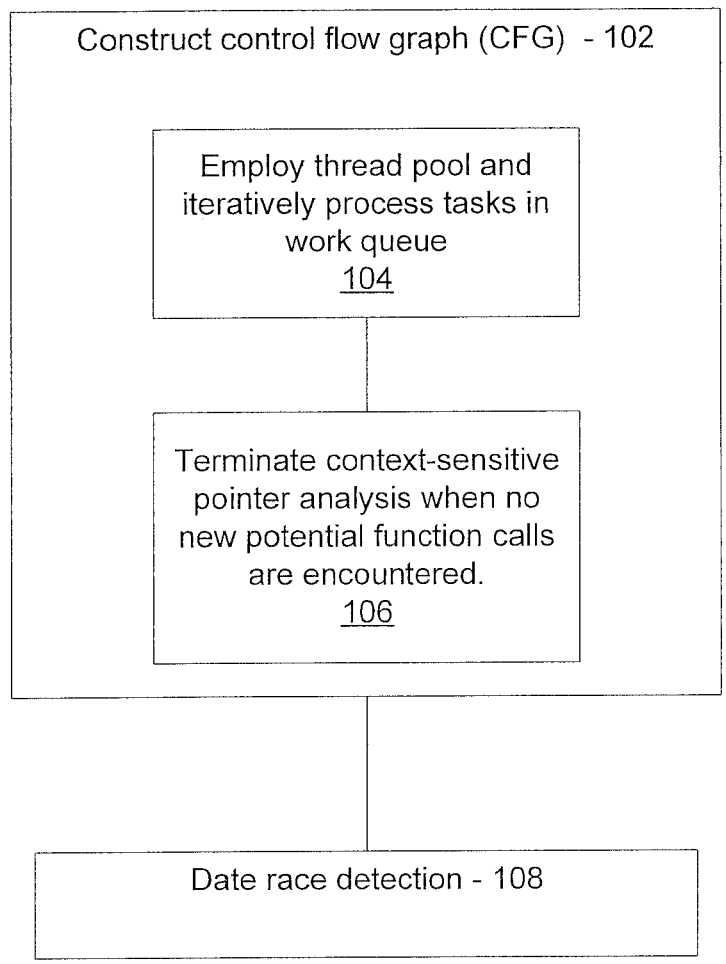
FIG. 3 is a block/flow diagram showing a method for constructing a control flow graph in accordance with another embodiment.

Referring to FIG. 3, a block/flow diagram for a system/method for analyzing a concurrent program stored in memory, which employs asynchronous function calls for communication and/or recursion is illustratively shown in accordance with one embodiment. In block 102, a control flow graph is constructed e.g., using a processor and a program application (e.g., Method 2), based on a context-sensitive pointer analysis. Upon encountering a function pointer, a points-to set of the function pointer is computed in a context-sensitive fashion to accurately determine a set of potential function calls.

In block 104, constructing the control flow graph may include employing a thread pool where each thread iteratively processes tasks from its work queue. A thread in the thread pool sends a task request to another thread to issue an asynchronous function call with the task as an argument. The asynchronous function calls may include fork and join events. Synchronous function calls may be performed within a same thread.

In block 106, the context-sensitive pointer analysis is terminated when no new potential function calls are encountered such that no new potential function calls are determined using a characterization of pointer aliasing encountered based upon complete update sequences to decide whether new aliases are discoverable. In block 108, data races in the concurrent program are determined using the control flow graph which includes resolved context sensitive pointers. The resolved context sensitive pointers of the control flow graph preferably include one or more of asynchronous calls, function pointers, thread pointers and recursion. Detecting data races includes context sensitive data race detection in the presence of recursion.

The data race detection in the concurrent program may include identifying shared variables and lock pointers, computing an initial database of race warnings, and pruning away spurious warnings using a may-happen-in-parallel (MHP) analysis based on computing lock sets and performing program order analysis.

Figure 4:
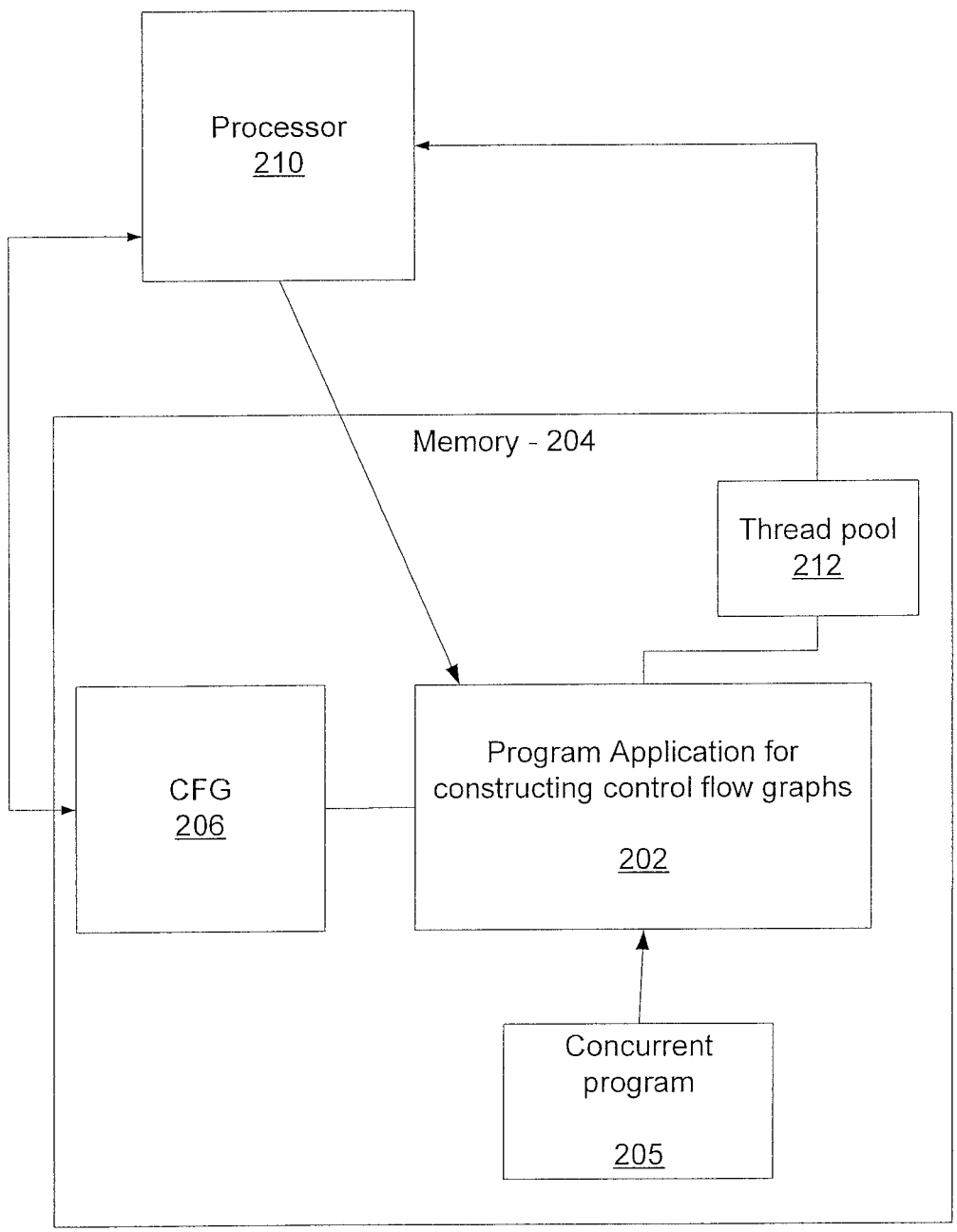
FIG. 4 is a block diagram showing a system for constructing a control flow graph and performing a static data race detection analysis in accordance with the present principles.

Referring to FIG. 4, a system 200 is provided for analyzing a concurrent program 205, which employs asynchronous function calls for communication. A program application 202 is stored on program storage media or memory 204 and is configured to construct a control flow graph 206 for a concurrent program 205 being analyzed. The control flow graph 206 is constructed based on a context-sensitive pointer analysis executed by the program application 202, wherein upon encountering a function pointer in the concurrent program, a points-to set of the function pointer is computed in a context-sensitive fashion to accurately determine a set of potential function calls.

The context-sensitive pointer analysis is terminated when no new potential function calls are encountered such that no new potential function calls are determined using a characterization of pointer aliasing encountered based upon complete update sequences to decide whether new aliases are discoverable. A processor 210 is configured to detect data races in the concurrent program using the control flow graph which includes resolved context sensitive pointers.

The resolved context sensitive pointers of the control flow graph 204 include one or more of asynchronous calls, function pointers, thread pointers and recursion. The control flow graph 204 includes a thread pool 212 where each thread iteratively processes tasks from its work queue, wherein the thread pool 204 sends task requests to other threads to issue an asynchronous function call with the task as an argument. The asynchronous function calls may include fork and join events. The processor 210 performs data race detection based on the CFG 206.

Having described preferred embodiments for fast and accurate data race detection for concurrent programs with asynchronous calls (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A context-sensitive method for analyzing a concurrent program stored in memory, which employs asynchronous function calls for communication and/or recursion, comprising:

constructing a control flow graph, using a processor, based on a context-sensitive pointer analysis, wherein upon encountering a function pointer, a points-to set of the function pointer is resolved dynamically on-the-fly in a context-sensitive fashion to accurately determine a set of potential function calls;

terminating the context-sensitive control flow graph construction when no new potential function calls are encountered that potentially contribute new data races that are not already discovered in existing contexts; and detecting data races in the concurrent program using the context-sensitive control flow graph which is constructed to not miss any potential data race by determining concurrent accesses under lock synchronization and program order constraints by obtaining context-sensitive locksets at each shared variable access location and checking if a predetermined pair of shared accesses has a common lock in corresponding locksets for all possible contexts and removing the predetermined pair of locations from a warning database.

2. The method as recited in claim 1, wherein function pointers encountered are resolved on-the-fly using a characterization of pointer aliasing based upon complete update sequences to decide whether new aliases are discoverable.

3. The method as recited in claim 1, wherein the context-sensitive construction of the control flow graph is terminated based on whether new shared variables accesses with different locksets other than those encountered in existing contexts can be discovered.

4. The method as recited in claim 3, wherein a fix-point computation is carried out via traversal of the control flow graph of the program by tracking aliases of lock pointers, aliases of shared variables and aliases of function pointers to decide whether new shared variable accesses with different locksets than those already encountered are discoverable.

5. A non-transitory computer readable storage device comprising a computer readable program for analyzing a concurrent program stored in memory, which employs asynchronous function calls for communication and/or recursion, wherein the computer readable program when executed on a computer causes the computer to perform the steps of:

constructing a control flow graph, using a processor, based on a context-sensitive pointer analysis, wherein upon encountering a function pointer, a points-to set of the function pointer is resolved dynamically on-the-fly in a context-sensitive fashion to accurately determine a set of potential function calls;

terminating the context-sensitive control flow graph construction when no new potential function calls are encountered that potentially contribute new data races that are not already discovered in existing contexts; and detecting data races in the concurrent program using the context-sensitive control flow graph which is constructed to not miss any potential data race by determining concurrent accesses under lock synchronization and program order constraints by obtaining context-sensitive locksets at each shared variable access location and checking if a predetermined pair of shared accesses has a common lock in corresponding locksets for all possible contexts and removing the predetermined pair of locations from a warning database.

6. The computer readable storage device as recited in claim 5, wherein function pointers encountered are resolved on-the-fly using a characterization of pointer aliasing based upon complete update sequences to decide whether new aliases are discoverable.

7. The computer readable storage device as recited in claim 5, wherein the context-sensitive construction of the control flow graph is terminated based on whether new shared variables accesses with different locksets other than those encountered in existing contexts can be discovered.

8. The computer readable storage device as recited in claim 7, wherein a fix-point computation is carried out via traversal of the control flow graph of the program by tracking aliases of lock pointers, aliases of shared variables and aliases of function pointers to decide whether new shared variable accesses with different locksets than those already encountered are discoverable.

9. A system for analyzing a concurrent program stored in memory, which employs asynchronous function calls for communication and/or recursion, comprising:

a program application stored on program storage media and configured to construct a control flow graph for a concurrent program being analyzed, the control flow graph being constructed based on a context-sensitive pointer analysis executed by the program application, wherein upon encountering a function pointer in the concurrent program, a points-to set of the function pointer is computed in a context-sensitive fashion to accurately determine a set of potential function calls, the context-sensitive pointer analysis being terminated when no new potential function calls are encountered such that no new potential function calls are determined using a characterization of pointer aliasing encountered based upon complete update sequences to decide whether new aliases are discoverable; and a processor configured to detect data races in the concurrent program using the control flow graph which includes resolved context sensitive pointers by determining concurrent accesses under lock synchronization and program order constraints by obtaining context-sensitive locksets at each shared variable access location and checking if a predetermined pair of shared accesses has a common lock in corresponding locksets for all possible contexts and removing the predetermined pair of locations from a warning database.

10. The system as recited in claim 9, wherein the resolved context sensitive pointers of the control flow graph include one or more of asynchronous calls, function pointers, thread pointers and recursion.

11. The system as recited in claim 9, wherein the control flow graph includes a thread pool where each thread iteratively processes tasks from its work queue, wherein the thread pool sends task requests to other threads to issue an asynchronous function call with the task as an argument.

12. The system as recited in claim 11, wherein asynchronous function calls include fork and join events.

\* \* \* \* \*